3,213,668
FREEZING POINT MONITOR
Kevin N. Thompson, New York, N.Y., assignor to Socony Mobil Oil Company, Inc., a corporation of New York
Filed Feb. 14, 1962, Ser. No. 173,190
7 Claims. (Cl. 73—17)

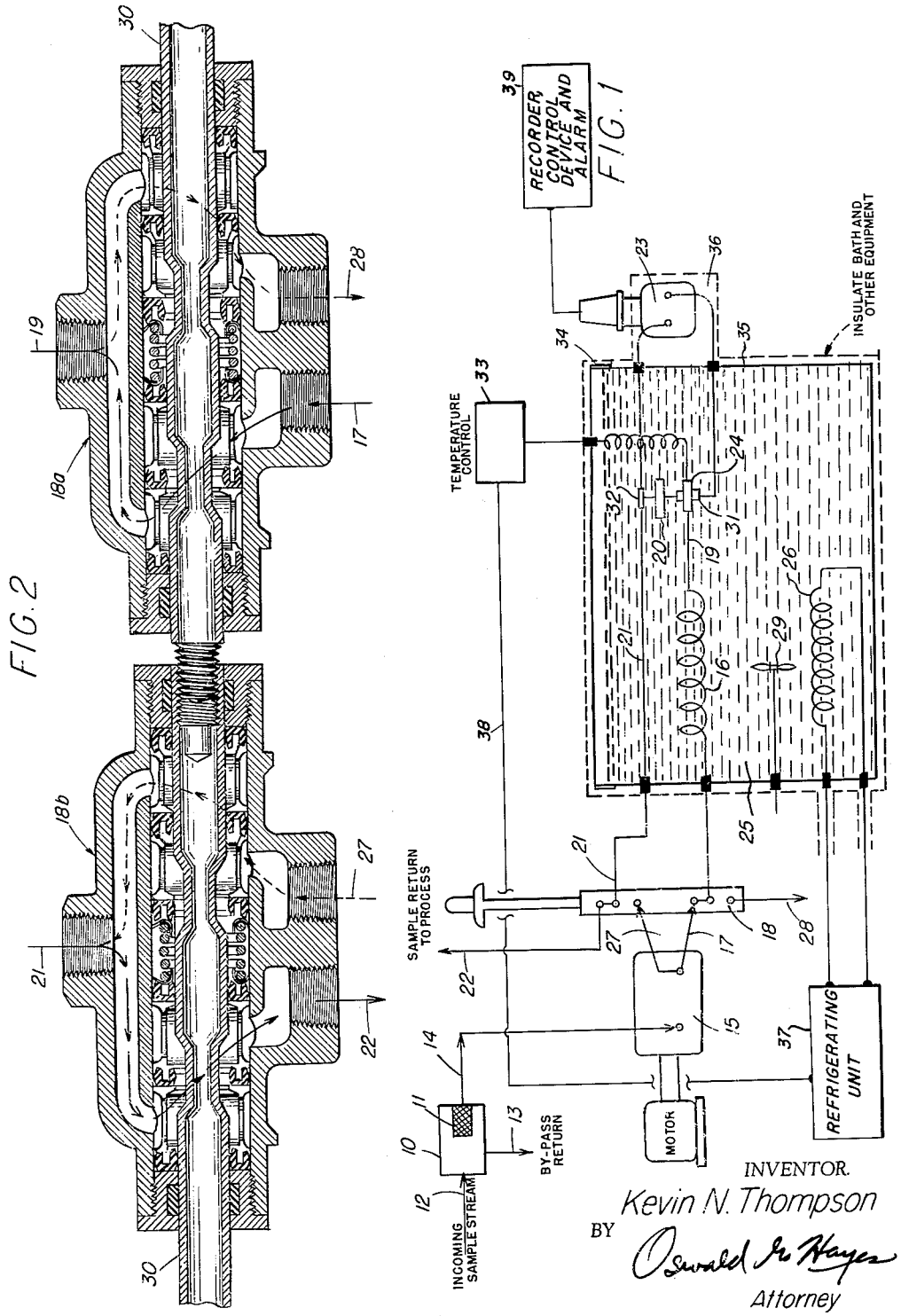

This invention relates to means for continuously monitoring a process stream to insure that the product meets freezing point specifications. It is specifically directed to the determination of crystal formation in petroleum fuels and lubricating oils at specification temperatures.

With the development in recent times of jet and diesel engines which require the use of heavier fuels than the gasoline engine and with the increasing use of such devices at higher latitudes and altitudes where the temperatures are far below those normally experienced in the United States, the petroleum industry has been facing the problem of developing fuels and lubricating oils which can be used under extremely cold conditions without losing any desirable flow characteristics. New processes have been developed to meet the new low temperature specifications for these products. One difficulty which has been plaguing the operators of these processes has been the delay in testing the product to determine whether it has met specifications. Quite often this would take several hours, during which time large quantities of material would have been produced, or perhaps the process conditions may have been changed to produce a different product during this period. If it is found that the sample does not meet specifications, it would be a major problem to re-process the entire run.

This invention is directed towards means for continuously and quickly checking the effluent from a refining operation to determine whether it meets its freezing point specifications. It will be able to give an answer within minutes after the effluent leaves the process stage so that any maladjustment will be quickly discovered and rectified before very much time and material has been lost.

Generally, this invention involves cooling at least a portion of a liquid process effluent to specification temperature and passing the cooled effluent through a filter having means attached to it for determining the pressure drop across the filter surface. Any crystals formed in the cooled effluent liquid will be held back by the filter, clogging its pores, and thus causing a sharp increase in the pressure drop across the filter. As defined by this specification a liquid may include a pure liquid, a multiphase mixture of liquids, or a liquid phase solution.

FIGURE 1 is a schematic illustration of a practical embodiment of the freezing point monitor.

FIGURE 2 is a diagrammatic cut-away view of one type of back-flush valve.

Referring to FIG. 1, a process effluent sample stream enters cartridge filter case 10 through conduit 12. A major portion of the effluent is by-passed through line 13 while a portion, for example 10 percent, passes through cartridge filter 11, which has a pore size of 10 microns or less. The effluent from the filter 11 passes through line 14 which leads to a metering pump 15 which is set at a constant rate. The effluent from pump 15 passes through line 17 to a back-flush valve 18, thence through line 19 to cooling tube coil 16 which may be made of a corrosion-resistant material such as stainless steel and in this particular embodiment has a 3/16" (O.D.) tube diameter. The chilled product passes from the coil 16 through line 19 to the inlet side of filter 20. Filter 20 in this instance comprises a sintered metal porous filter disc in a union holder with a 10 micron pore diameter. Line 21 leads from the outlet side of filter 20 back to the back-flush valve 18. (See description of FIG. 2 below for details of the valve's operation.) The product exhausts through sample discharge line 22 which leads back to the main process stream, not shown.

A pressure differential cell 23 is attached to lines 19 and 21 at points respectively just before and beyond the inlet and outlet sides of the filter 20. An example of this type of pressure measuring device is a force-balance differential pressure transmitter capable of measuring in the range of about 0–20 to 0–250 and 0–200 to 0–850 inches of $H_2O$ which converts the measurement into a standard pneumatic or electrical signal to operate a recorder, control device or alarm, 39. To minimize the possibility of gas bubbles forming in the lead lines to said pressure cell, which may create a false pressure drop, the cell should be kept at approximately the same level with the filter. Temperature bulb 24 is located in line 19 at the point where the upstream inlet lead to the pressure cell 23 is attached. The temperature bulb 24 and the pressure cell inlet lead may be attached to two arms of a pipe cross 31, the other two arms of the cross being connected into line 19. The pressure cell outlet may be attached to one arm of a pipe T 32, the other two arms of said T being connected into line 21. Temperature bulb 24 is connected to temperature control mechanism 33 which regulates a refrigerating unit 37 by means of a signal transmitted through line 38.

The entire flow system and apparatus described above except the pressure differential cell, back-flush valve and metering pump is immersed in a constant temperature bath 25 which may be chilled down to $-100°$ F., for example, with a temperature control of $\pm 1°$ F., by cooling coils 26 attached to a refrigeration system 37. As the specification temperature is lowered, it becomes increasingly difficult to cool the sample down to the required temperature. It is thus advantageous to keep heat transfer to a minimum by having all of the portions of the test apparatus which come in direct contact with the flowing sample, after the back-flush valve 18, immersed in the constant temperature bath 25.

It is desirable to have a stirring means, such as impeller 29, for the constant temperature bath. The bath cover 34 and box 35 may be of insulated, air-tight construction to prevent condensation of atmospheric moisture into the bath liquid. Insulation 36 covers the box 35 and cover 34 as well as the pressure differential cell 23.

The bath fluid may be any inert material which maintains good flow characteristics at the desired temperatures. Examples of these materials are those di-methyl silicones and phenylmethyl silicones which have good flow characteristics below $-100°$ F. For duty at higher temperatures, other, less expensive materials would be suitable such as kerosine, ethylene glycol-water, or alcohol-water.

Flushing by-pass 27 leads from the exhaust end of pump 15 to a port in back-flush valve 18. The system is so designed that by changing the setting of the valve 18 the product flows in the reverse direction through filter 20 and cooling coil 16. When the valve position is set to back-flush, the uncooled product effluent flows through the valve 18 and line 21 into the outlet side of filter 20 and out through line 19, cooling coil 16 and valve 18 into drain line 28.

Referring to FIG. 2, the back-flush valve 18 may be two four-way piped exhaust valves, the valve stems 30 of each valve being connected together so that the two valves will act as a single unit. The position of the valve stems 30 shown in the diagram allows the process effluent to flow through the filter 20 after it has been cooled in coil 16. In the second position, in which the stems are moved toward 18a, the flow is as indicated by the dotted lines: the warm effluent is allowed to flush in the reverse direction through filter 20 and out to the drain line 28. The valve stem position may be changed by hand when desired or it may be operated automatically by solenoid instruments which are commercially available. This valve system is not critical to this invention and any suitable valve arrangement would be satisfactory.

In the operation of this particular embodiment of the device, pump 15 is set to deliver two gallons/hr. of the product through valve 18 to coil 16 where it is cooled to the temperature of the bath in which th coil is immersed, for example −75° F. The cooled sample flows to the filter 20 where any crystal or solid particles that were formed by the cooling operation become imbedded in the filter. Any solid impurities which were present from the process were previously taken out in the cartridge filter 11 which has, preferably, a slightly smaller pore diameter than the filter 20; for example, filter 20 may have a pore diameter of 10 microns while filter 10 will have a pore diameter of 8 microns. The solid particles which become imbedded in filter 20 cause an increase in the pressure drop across the filter which is recorded and/or signaled by pressure differential cell 23 through recorder, control device and alarm 39. If the process effluent, such as kerosine or lube oil, forms crystals and so fails to pass the test and meet specifications, the process conditions may be quickly adjusted or the process may be shut down. To clean the filter after such a test failure, the position of the valve stems 30 of the back-flush valve 18 is changed to the second position so that the product flows from the pump 15 through the valve 18 and into flushing by-pass 27. The back-flush valve 18 may be operated automatically or manually after the pressure differential across the filter 20 is sufficient to set off the alarm. The fluid will flow in the reverse direction through the filter and cooling coil which will wash all of the imbedded crystals out of the filter mesh and the coil and out through the drain line 28. Flushing by-pass line 27 is not immersed in the cooling bath so that the oil reaching the filter is still warm enough to be able to dissolve away the crystals imbedded in the filter screen.

The pressure reading means may be attached to means for automatically closing down the process or for varying the process conditions in case of a failure of the product to meet specifications or it may only sound an alarm as described above. As an example, in the solvent dewaxing of petroleum products to achieve lower pour points, if the product does form crystals which tend to clog the filter 20, the pressure differential cell 23 may send a signal to increase the amount of oil solvent added to the process feed and to lower the chilling temperature to which the mixture of solvent and feed is subjected to precipitate more of the wax present in the feed.

The filter may be a micrometallic, or equivalent grade G, 1/8" sintered stainless steel in approximately a 1/2" IPS (iron pipe size) union holder. The pressure differential cell may have either a pneumatic or an electric output to operate an alarm system, control device and/or a recorder. It would of course be within the scope of the invention to substitute any other means for measuring pressure drop for the pressure differential cell described above; for example, a manometer attached at a point upstream from the filter would be sufficient if the sample were exhausted to the atmosphere. The constant temperature bath may be cooled by any known refrigerating means, utilizing a refrigerant such as ethane or ammonia.

The filter used may be of any suitable type or size for the given application. Finally, the cooling coil 16 should be of a size and shape sufficient to handle the amount of fluid desired to be tested: to insure cooling the effluent down to the specified temperature before it is passed to the filter.

This device is suitable to be used for the testing of any fluid which has a freezing or precipitation temperature specification as a means for controlling the manufacturing process therefor. It may be used in testing fuels and lubricants which are to be used at low temperatures or other liquids of any sort which may be used in operations which would be interfered with by the formation of a precipitate. Specific examples of these materials include jet fuels, diesel fuels, kerosines, burner fuels and other fuels, lubricating oils as well as such other products as pre-mixed packaged internal combustion engine coolants.

The simplicity of this operation makes it extremely well suited for industrial operations where its ease of maintenance and its ability to quickly indicate whether a product meets specifications are needed. This is especially valuable in continuous-flow processes where a large amount of product may be wasted unless the testing means is fast and accurate.

The continuous filtration system used here is extremely simple and the maintenance will consist primarily in changing or cleaning filters. To avoid any shut-down time because of filter clogging during the process operation, it would be possible to build parallel filters (for both filter 11 and filter 20) through which the product may be passed while the first filter is being changed or cleaned.

The specific embodiments described above are merely exemplary of the general idea of the invention and they should not be construed as restricting the scope and breadth of the invention as it is set out in the claims below.

What is claimed is:

1. Apparatus for determining whether a liquid will form a solid precipitate at a specified temperature, comprising heat exchange means for adjusting the temperature of said liquid to said specified temperature, filter means for filtering said liquid, conduit means for conducting said liquid from said heat exchange means to said filter means, a pump-metering system connected to the heat exchange means and filter means for circulating the liquid through the heat exchange means and filter means at a desired rate, means for maintaining said filter means and said conduit means at substantially said specified temperature, means for measurement of the pressure drop across said filter means, and means for converting said measurement to a signal representative of said pressure drop.

2. The apparatus of claim 1 having means for measuring and controlling the temperature of the liquid passing through the filter.

3. Apparatus for monitoring the liquid effluent from a manufacturing process to determine whether said liquid meets freezing point specification comprising a first filtering means, pump-metering means for admitting the liquid sample into said apparatus at the desired rate, conduit means for carrying said liquid from said first filtering means to said metering means, a back-flush valve, conduit means between said metering means and said back-flush valve, a cooling coil, a second filter having a pore diameter no smaller than that of said first filtering means, conduit means between said back-flush valve and said cooling coil and between said cooling coil and said second filtering means, discharge conduit means leading from said second filtering means, pressure determining means for measuring and indicating the pressure drop across said second filter means, a sudden increase in said pressure drop indicating the formation of solid material in said cooled liquid, and a constant temperature bath in which are immersed the portions of the following pieces of apparatus which are in direct contact with said liquid: the cooling coil, the second filtering means and the conduits connecting these pieces of apparatus.

4. In combination with the apparatus of claim 3, means for cleaning said second filter means after a sudden increase in pressure drop indicating the presence of solid material, comprising said back-flush valve, a flushing bypass conduit, and a drain conduit, said back-flush valve having two operating positions and being arranged and adapted so that in a first position liquid may flow in the direction from said cooling coil to said second filter means and out to the discharge conduit, and that in a second position the liquid flows from said flushing by-pass conduit, through the filter and cooling coil in the reverse direction and out through said drain conduit.

5. Apparatus for continuously determining whether a liquid process effluent meets a freezing point specification, comprising heat exchange means for chilling at least a portion of said effluent to a specified temperature, filter means for filtering the chilled effluent, conduit means for conducting the chilled effluent from said heat exchange means to said filter means, a pump-metering system connected to the heat exchange means and filter means for circulating said portion of the effluent through the heat exchange means and filter means at a desired rate, means for maintaining said conduit means and said filter means at substantially the temperature of the chilled effluent, means for measuring the pressure drop across said filter means, and means for converting said measurement to a signal representative of said pressure drop.

6. A method for determining whether a liquid will form a solid precipitate at a specified temperature comprising adjusting said liquid to the specified temperature, filtering said liquid after it has been adjusted to the specific temperature, maintaining at substantially said specific temperature the means employed for filtering said liquids, and measuring the pressure differential between points upstream and downstream of said filtering operation to determine whether any precipitate has formed: a sudden increase in said pressure differential indicating the presence of a precipitate in said liquid.

7. A method for continuously determining whether a process effluent liquid meets a freezing point specification comprising cooling said effluent to specification temperature, filtering said cooled effluent, maintaining at said specification temperature the means employed for filtering said cooled effluent, and measuring the pressure differential between points upstream and downstream of said filtering operation: a sudden increase in said pressure differential indicating the formation of solid particles in said cooled effluent.

References Cited by the Examiner
UNITED STATES PATENTS

| | | | |
|---|---|---|---|
| 1,766,166 | 6/30 | Callow | 210—425 |
| 2,707,964 | 5/55 | Monroe | 137—4 |
| 2,741,264 | 4/56 | Leonard | 137—625.5 |
| 2,834,200 | 5/58 | Rhodes et al. | 73—55 |
| 2,997,874 | 8/61 | Billuris et al. | 73—17 X |

RICHARD C. QUEISSER, *Primary Examiner.*